(12) United States Patent
Swanson

(10) Patent No.: US 9,427,612 B1
(45) Date of Patent: Aug. 30, 2016

(54) HORIZONTAL BAR HOOK

(71) Applicant: Thor S Swanson, Sun Prairie, WI (US)

(72) Inventor: Thor S Swanson, Sun Prairie, WI (US)

(73) Assignee: Johnson Health Tech Co., Ltd., Taichung (TW)

( * ) Notice: Subject to any disclaimer, the term of this patent is extended or adjusted under 35 U.S.C. 154(b) by 0 days.

(21) Appl. No.: 14/641,459

(22) Filed: Mar. 9, 2015

(51) Int. Cl.
*A63B 26/00* (2006.01)
*A63B 21/068* (2006.01)
*A63B 1/00* (2006.01)
*F16M 13/02* (2006.01)
*A63B 23/12* (2006.01)

(52) U.S. Cl.
CPC ............... *A63B 1/005* (2013.01); *A63B 1/00* (2013.01); *A63B 23/12* (2013.01); *F16M 13/02* (2013.01)

(58) Field of Classification Search
CPC .. A63B 1/00; A63B 1/005; A63B 21/00047; A63B 21/000178; A63B 21/02; A63B 21/023; A63B 21/025; A63B 21/04; A63B 21/0407; A63B 21/0414; A63B 21/0421; A63B 21/0428; A63B 21/0435; A63B 21/0442; A63B 21/045; A63B 21/0455; A63B 21/068; A63B 21/08; A63B 21/16; A63B 21/1618; A63B 21/1627; A63B 21/1636; A63B 21/1645; A63B 21/1654; A63B 21/1663; A63B 21/169; A63B 21/4023; A63B 21/4027; A63B 21/4033; A63B 21/4035; A63B 23/02; A63B 23/0205; A63B 23/0211; A63B 23/12; A63B 23/1209; A63B 23/1218; A63B 23/1236; A63B 23/1245; A63B 23/1281; A63B 69/0057; A63B 69/0059; A63B 2069/0062; A63B 2071/009; A63B 2208/0257; A63B 2208/0285; A63B 2208/029; A63B 2225/09; A63B 2225/093; Y10T 403/33; Y10T 403/39; Y10T 403/3981; Y10T 403/602; Y10T 403/604
USPC ................ 248/235, 250, 251, 261, 264
See application file for complete search history.

(56) References Cited

U.S. PATENT DOCUMENTS

| | | | | |
|---|---|---|---|---|
| 829,653 | A * | 8/1906 | Kercher | A63B 1/00 482/40 |
| 849,035 | A * | 4/1907 | Westenhoff | A63B 21/1627 482/40 |
| 2,443,149 | A * | 6/1948 | Rundell | A47J 47/16 248/264 |
| 2,518,328 | A * | 8/1950 | Janonis | A47K 10/3836 211/123 |
| 2,569,756 | A * | 10/1951 | Grigsby | E06B 9/50 248/268 |

(Continued)

*Primary Examiner* — Oren Ginsberg
*Assistant Examiner* — Gary D Urbiel Goldner

(57) ABSTRACT

The present invention relates to a locking device for retaining one end part of a horizontal bar. The locking device includes a housing and a retaining block. The housing has an inclined groove defining a closed end and an open end, and the open end is above the closed end so that the end part of the horizontal bar is able to be rested in the closed end of the inclined groove of the housing. The retaining block is rotatable with respect to the housing between a first position where the retaining block is located in the inclined groove for retaining the end part of the horizontal bar, and a second position where the retaining block is moved out of the inclined groove for allowing the end part of the horizontal bar to be removed from the housing.

6 Claims, 6 Drawing Sheets

(56) References Cited

U.S. PATENT DOCUMENTS

| | | | | |
|---|---|---|---|---|
| 2,919,134 A | * | 12/1959 | Zuro | A63B 21/04 211/105.4 |
| 3,038,773 A | * | 6/1962 | Vasbinder, Sr. | A47K 1/09 211/164 |
| 3,047,293 A | * | 7/1962 | Schaeffer | A63B 1/005 248/363 |
| 3,282,604 A | * | 11/1966 | Goldberg | B60N 2/2884 280/748 |
| 3,342,484 A | * | 9/1967 | Christensen | A63B 1/005 248/243 |
| 3,457,786 A | * | 7/1969 | Trent | A63B 1/00 482/40 |
| 3,525,521 A | * | 8/1970 | Sylvester | A63B 1/005 482/40 |
| 3,738,650 A | * | 6/1973 | Ossenkop | A63B 21/1627 248/264 |
| 3,891,091 A | * | 6/1975 | Anderson | A47H 1/144 211/105.3 |
| 4,272,070 A | * | 6/1981 | Schachner | A63B 1/005 482/39 |
| 4,405,127 A | | 9/1983 | Miller | |
| D274,076 S | * | 5/1984 | Miller | D21/694 |
| 4,458,894 A | * | 7/1984 | Dudley | A63B 1/00 482/40 |
| 4,473,225 A | * | 9/1984 | Miller | A63B 1/005 248/264 |
| 4,529,191 A | * | 7/1985 | Miller | A63B 1/00 211/123 |
| 4,657,242 A | * | 4/1987 | Guridi | A63B 1/005 482/40 |
| 4,772,011 A | * | 9/1988 | Guridi | A63B 1/005 482/37 |
| 4,775,056 A | * | 10/1988 | Inglis | A63B 1/005 211/100 |
| 5,180,350 A | * | 1/1993 | Thomas | A63B 21/1627 482/138 |
| 5,389,055 A | * | 2/1995 | Gangloff | A63B 1/005 482/142 |
| 5,569,123 A | * | 10/1996 | Creatchman | A63B 21/00047 482/39 |
| D392,177 S | * | 3/1998 | Ouellette, Sr. | D8/380 |
| 6,017,293 A | * | 1/2000 | Pfefferle | A63B 21/1627 482/104 |
| 6,347,780 B1 | * | 2/2002 | Holbrook | F16M 13/02 248/227.1 |
| 7,819,784 B1 | * | 10/2010 | Caswell | A63B 21/1627 482/904 |
| 8,047,972 B1 | * | 11/2011 | Dean | A63B 1/005 482/101 |
| 8,500,608 B1 | * | 8/2013 | Bonomi | A63B 21/062 482/101 |
| 8,777,023 B2 | * | 7/2014 | Hendricks | A01G 5/04 160/349.2 |
| 8,813,766 B2 | * | 8/2014 | Bhajak | A47L 15/504 134/135 |
| 2011/0190098 A1 | * | 8/2011 | Griswold | A63B 1/00 482/40 |
| 2012/0129658 A1 | * | 5/2012 | Hunt | A63B 1/00 482/38 |
| 2013/0187018 A1 | * | 7/2013 | Canfield | G09F 17/00 248/219.4 |
| 2015/0289695 A1 | * | 10/2015 | Woodruff | A47G 25/0692 211/105.3 |

* cited by examiner

HORIZONTAL BAR HOOK

BACKGROUND

1. Field of the Invention

The present disclosure relates to an exercise apparatus. More particularly, the present disclosure relates to a locking device of a horizontal bar.

2. Description of the Related Art

A horizontal bar or chinning bar is provided for pull-up exercise, and it can effectively enhance the human body's flexibility and train the upper body muscle. Generally, the horizontal bar is fixed on the outside ground and includes two fixed posts and a cylindrical bar. Since the aforementioned horizontal bar cannot be detached generally, the horizontal bar is limited to be used in a specific area. Therefore, a detachable horizontal bar is provided for a user to use, and it could be mounted on indoor walls, a doorway, or any two opposite posts of an exercise apparatus.

One type of the detachable horizontal bar is shown in U.S. Pat. No. 4,405,127, which includes a telescoping tube and two mounting brackets adapted to be secured to opposite sides of the doorway. The two mounting brackets each have a passageway defined therein. The telescoping tube has two laterally extending end plates at two ends thereof. The end plates of the telescoping tube could be received in the passageways of the two mounting brackets for supporting the horizontal bar. However, the conventional horizontal bar does not have any retaining mechanism. Therefore, the whole structure of the horizontal bar would be unstable during the exercise.

The present invention has arisen to mitigate and/or obviate the disadvantages of the conventional horizontal bar. Further benefits and advantages of the present invention will become apparent after a careful reading of the detailed description with appropriate reference to the accompanying drawings.

SUMMARY

The present invention relates to an improved a locking device of a horizontal bar. In particular, the locking device has a retaining mechanism for effectively securing one end part of the horizontal bar.

According to one aspect of the present invention, the locking device includes a housing, a retaining block and an elastic member. The housing has an inclined groove therein and an opening in communication with the inclined groove and an interior of the housing. The inclined groove defines a closed end and an open end at one side of the housing, and the open end is higher than the closed end so that the end part of the horizontal bar is rested in the closed end of the inclined groove of the housing. The retaining block has a pivoting portion pivotally mounted in the housing. The retaining block is rotatable with respect to the housing between a first position where the retaining block is protruded in the inclined groove through the opening of the housing to defined an abutting face toward the open end of the inclined groove and a retaining face toward the closed end of the inclined groove for retaining the end part of the horizontal bar, and a second position where the retaining block is moved out of the inclined groove for allowing the end part of the horizontal bar to be removed from the housing. The retaining block further has a controlling portion opposite to the pivoting portion for being operated from the first position to the second position. Specifically, the elastic member is disposed in the interior of the housing for normally biasing the retaining block in the first position. Accordingly, the end part of the horizontal bar could be inserted into the inclined groove of the housing by pushing the abutting face of the retaining block toward the second position, and the retaining block is restored back to the first position once the end part of the horizontal bar is rested in the closed end of the inclined groove.

Preferably, the inclined groove of the housing is defined by two parallel side walls and the end part of the horizontal bar has two corresponding parallel planes. When the end part of the horizontal bar is inserted into the inclined groove, the two parallel planes of the end part respectively abut against the two parallel side walls of the inclined groove to prevent the horizontal bar from being rotated.

Preferably, the housing has an aperture and the retaining block has a pushing button forming the controlling portion, the pushing button projecting through the aperture of the housing.

The reader is advised that this summary is not meant to be exhaustive. Further features, aspects, and advantages of the present invention will become better understood with reference to the following description, accompanying drawings and appended claims.

Further benefits and advantages of the present invention will become apparent after a careful reading of the detailed description with appropriate reference to the accompanying drawings.

DETAIL DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

Figure 1:
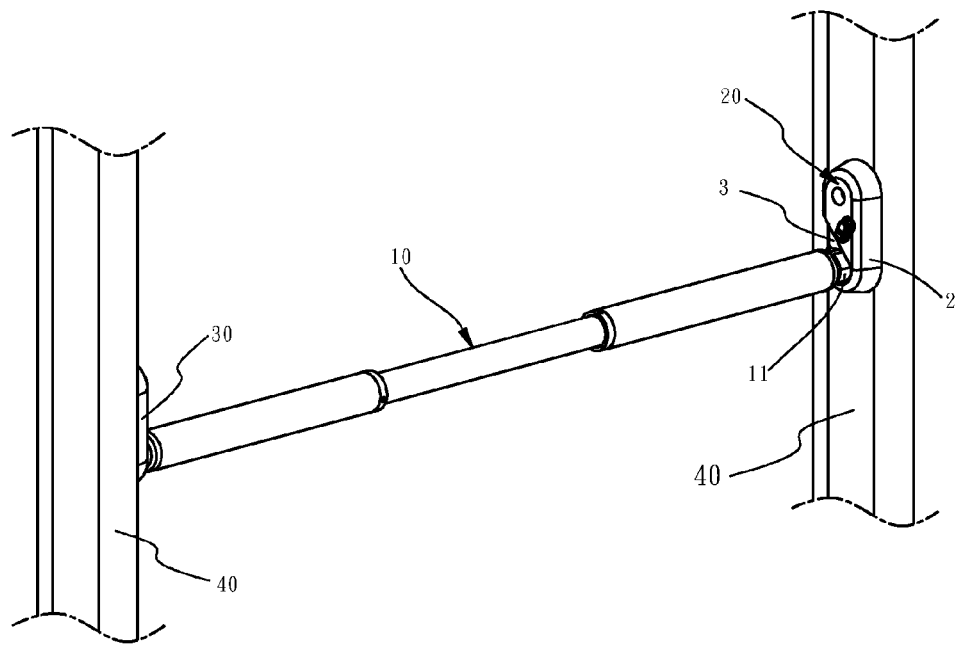
FIG. 1 is a perspective view of a horizontal bar set in accordance with a preferred embodiment of the present invention.

Referring to FIGS. 1 through 4, according to a preferred embodiment of the present invention, a horizontal bar set is described as follows. The horizontal bar set includes a horizontal bar 10, a locking device 20 and a supporting base 30. As shown in FIG. 1, the locking device 20 and the supporting base 30 are mounted on two opposite posts 40 for supporting and fixing two end parts 11 of the horizontal bar 10.

Figure 3:
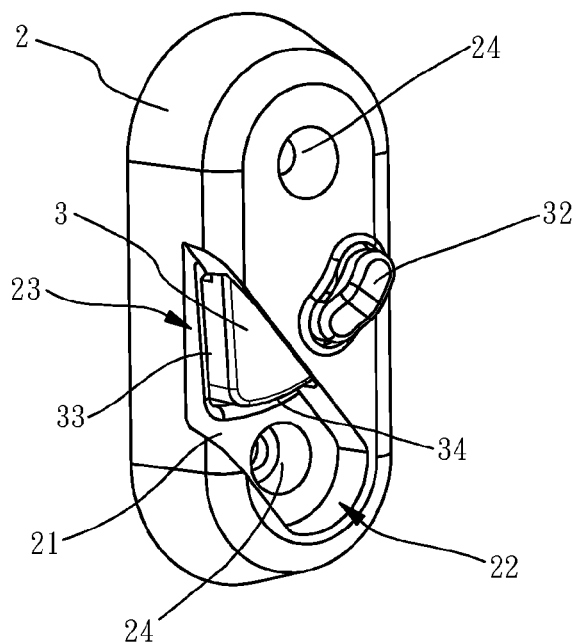
FIG. 3 is a perspective view of the locking device.

The locking device 20 provides easy installation and detachment for the horizontal bar 10. The locking device 20 includes a housing 2, a retaining block 3 and an elastic member 4. The housing 2 has an inclined groove 21 defined therein. As shown in FIG. 3, the inclined groove 21 is formed by two parallel side walls, one arc face connecting the two side walls, and a bottom wall to define a closed end 22 and an open end 23. Specifically, the open end 23 of the inclined groove 21 is located at one side of the housing 2 and is above the closed end 22 of the inclined groove 21 so as to form a hook portion on the housing 2. It allows one end part 11 of the horizontal bar 10 to be slid into the inclined groove 21 of the housing 2 from the open end 23 and be rested in the closed end 22 such that the hook portion of the housing 2 is regarded as a bracket to uphold the horizontal bar 10. The housing 2 further has two lock holes 24 for fixing the housing 2 on the post 40.

Figure 2:
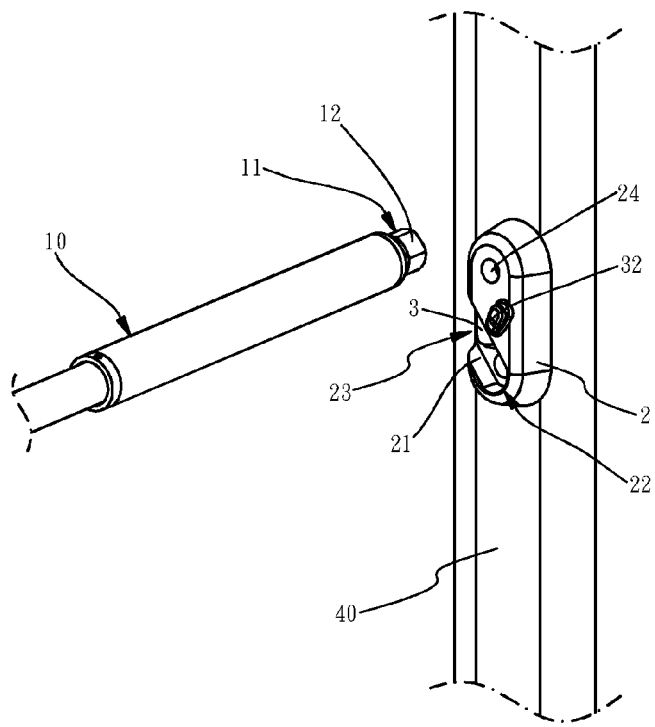
FIG. 2 is a partial enlarged view of the horizontal bar set for showing one end of the horizontal bar detached from the locking device.

Moreover, as shown in FIG. 2, each one of the two end parts 11 of the horizontal bar 10 has two parallel planes 12 respectively corresponding to the two parallel side walls of the inclined groove 21. Thus, the end part 11 of the horizontal bar 10 could be inserted into the inclined groove 21 only when the end part 11 of the horizontal bar 10 is rotated to a certain angle. When the end part 11 of the horizontal bar 10 is rested in the closed end 22 of the inclined groove 21, the two parallel planes 12 of the end part 11 respectively abut against the two parallel side walls of the inclined groove 21 so as to restrict the movement of the horizontal bar 10 and prevent any axial rotation of the horizontal bar 10 during the exercise.

Figure 4:
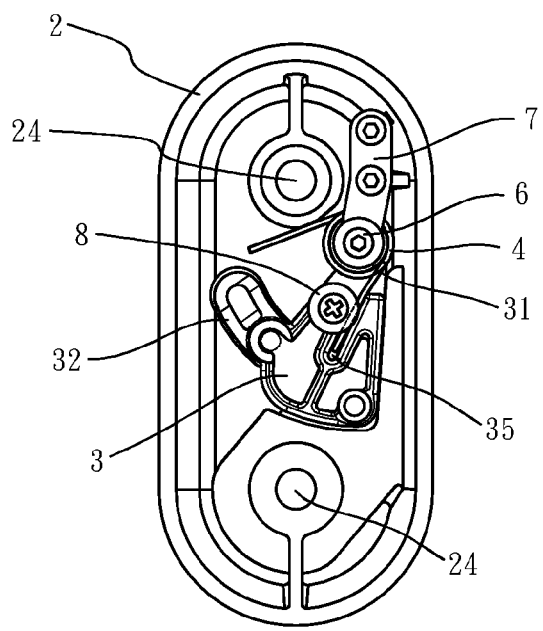
FIG. 4 is a rear elevation view of the locking device.
Figure 5:
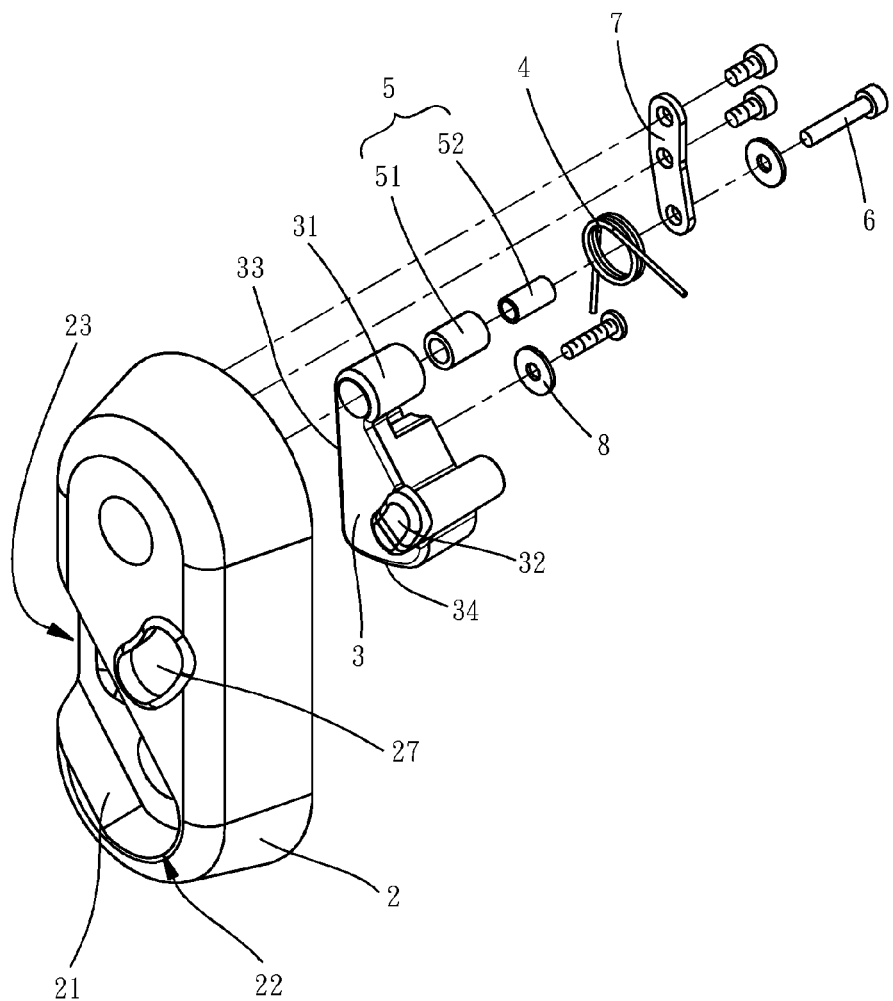
FIG. 5 is an exploded perspective view of the locking device.
Figure 6:
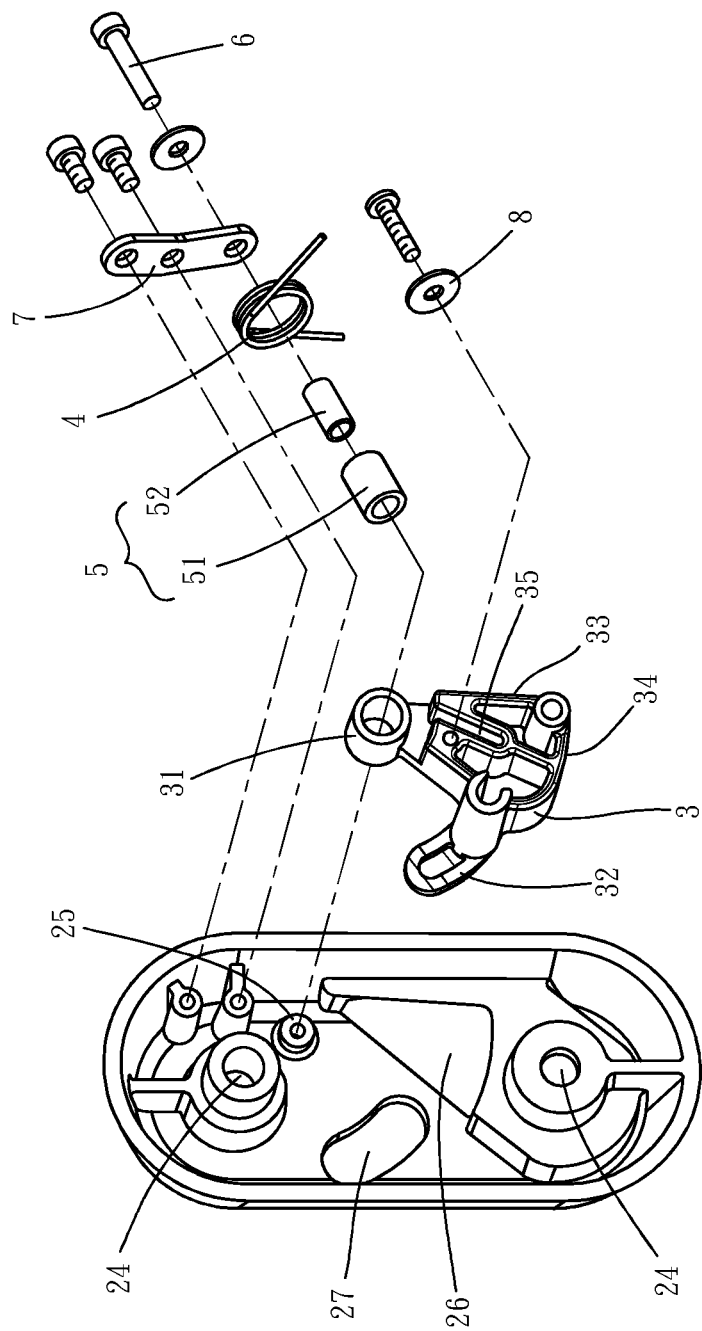
FIG. 6 is another exploded perspective view of the locking device taken from another angle.

Referring to FIGS. 4 through 6, the retaining block 3 is substantially sector-shaped, and has a pivoting portion 31 at a top of thereof. As shown in FIG. 6, the housing 2 has a stub 25 defined therein for pivotally positioning the pivoting portion 31 of the retaining block 3. Additionally, a bushing 5 is disposed in the pivoting portion 31 of the retaining block 3 for smooth rotation of the retaining block 3. The bushing 5 consists of an outer sleeve 51 and an inner sleeve 52. A pivot shaft 6 passes through the bushing 5 and connects with the stub 25 of the housing 2, so that the retaining block 3 could be pivoted with respect to the housing 2. A fixing plate 7 has one end connected with the housing 2 and the other end is interposed between the pivoting portion 31 of the retaining block 3 and a head of the shaft 6 to fix one end of the pivot shaft 6 opposite to the stub 25.

As shown in FIG. 6, the housing 2 has an opening 26 in communication with the inclined groove 21 and an interior of the housing 2. The opening 26 is sized and shaped to correspond to the retaining block 3, which allows the retaining block 3 being moved into the inclined groove 21 through the opening 26 of the housing 2, as shown in FIG. 3. Thus, two sides of the retaining block 3 within the inclined groove 21 are respectively defined as an abutting face 33 toward the open end 23 of the inclined groove 21 and a retaining face 34 toward the closed end 22 of the inclined groove 21, for retaining any one end part 11 of the horizontal bar 10 so as to prevent unexpected detachment and shake of the horizontal bar 10 during the exercise. Specifically, as shown in FIG. 5 and referring to FIG. 3, the retaining block 3 has a pushing button 32 extending therefrom and opposite to the pivoting portion 31 and the abutting face 33 for being operated by a user to rotate the retaining block 3. Besides, the housing 2 has an aperture 27 corresponding to the pushing button 32. In this way, the pushing button 32 could pass through the aperture 27 of the housing 2 for the user to operate easily.

Figures 7, 8:
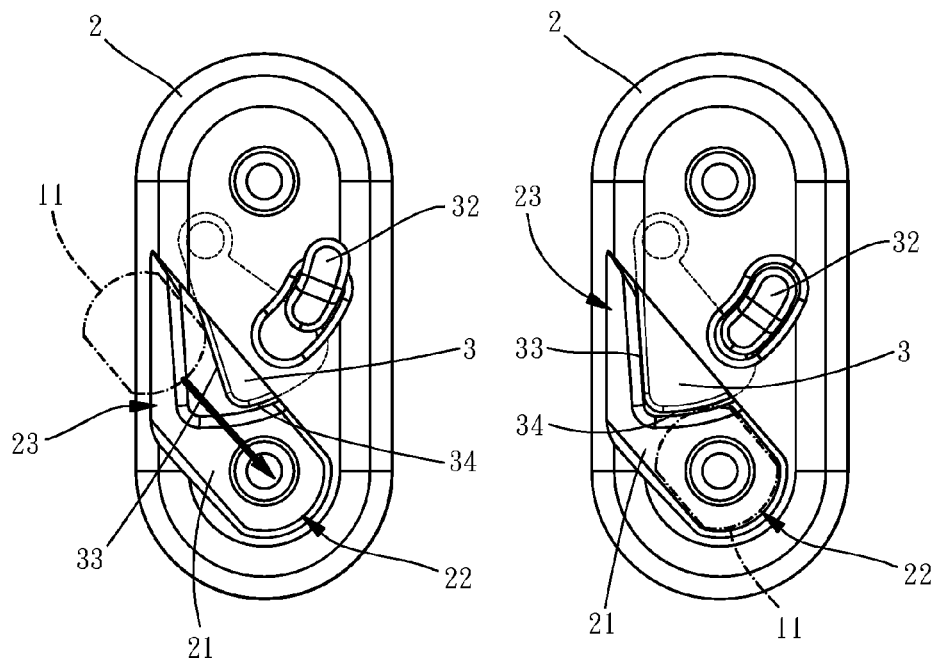
FIG. 7 illustrates that one end part of the horizontal bar abuts against the retaining block into the inclined groove of the housing.
FIG. 8 illustrates that one end part of the horizontal bar is rested in the inclined groove of the housing and retained by the retaining block.
Figure 9:
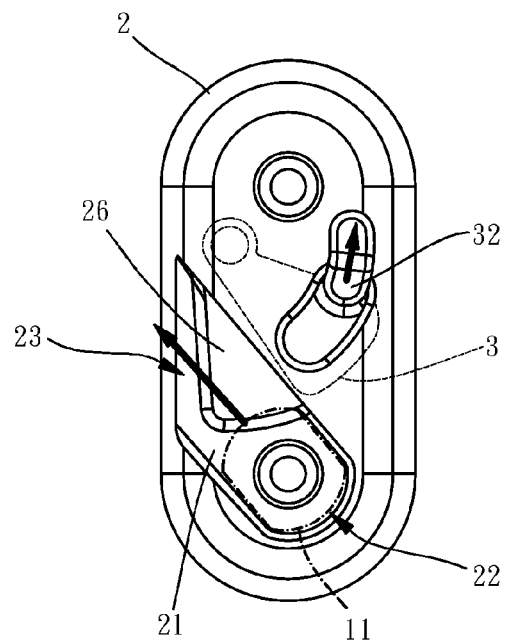
FIG. 9 illustrates that the retaining block is operated to move out of the inclined groove of the housing for allowing one end part of the horizontal bar to be removed.

Referring to FIGS. 7 through 9, the retaining block 3 is rotatable with respect to the housing 2 between a first position (as shown in FIG. 8) and a second position (as shown in FIG. 9). When the retaining block 3 is rotated to the first position, the retaining block 3 is partially located in the inclined groove 21 to partially stop the open end 23 of the inclined groove 21. In contrast, when the retaining block 3 is rotated to the second position, the retaining block 3 is moved out of the inclined groove 21 into the interior of the housing 2 for allowing the end part 11 of the horizontal bar 10 to be moved into or removed from the inclined groove 21 of the housing 2. Specifically, the elastic member 4 is disposed in the interior of the housing 2 and provides an elastic force for normally biasing the retaining block 3 in the first position, so that the retaining block 3 normally stops the open end 23 of the inclined grove 21, as shown in FIGS. 3 and 4. In the preferred embodiment of the present invention, the elastic member 4 is a torsion spring. Referring to FIGS. 4 and 6, the elastic member 4 is mounted around the pivoting portion 31 of the retaining block 3. One end of the elastic member 4 is retained in a positioning slot 35 of the retaining block 3, and the other end of the elastic member 4 abuts against an inner protruded portion of the housing 2. Moreover, the retaining block 3 has a washer 8 locked on a rear side thereof and partially covering the positioning slot 35 for preventing the end of the elastic member 4, which is retained in the positioning slot 35, from breaking away from the positioning slot 35 of the retaining block 3, as shown in FIG. 4.

As shown in FIG. 7, any one end part 11 of the horizontal bar 10 could be inserted into the inclined groove 21 of the housing 2 by pushing the abutting face 33 of the retaining block 3 from the first position toward the second position, and the retaining block 3 is restored back to the first position by the elastic force of the elastic member 4 once the end part 11 of the horizontal bar 10 is slid into the inclined groove 21 entirely and rested in the closed end 22 of the inclined groove 21. At the same time, the retaining face 34 of the retaining block 3 abuts against the end part 11 of the horizontal bar 10 so as to prevent unexpected detachment of the horizontal bar 10, as shown in FIG. 8. Specifically, when the user wants to detach the horizontal bar 10 from the locking device 20, the user just need to push the pushing button 32 to make the retaining block 3 move out of the inclined groove 21 into the housing 2 to remove the horizontal bar 10.

Figure 10:
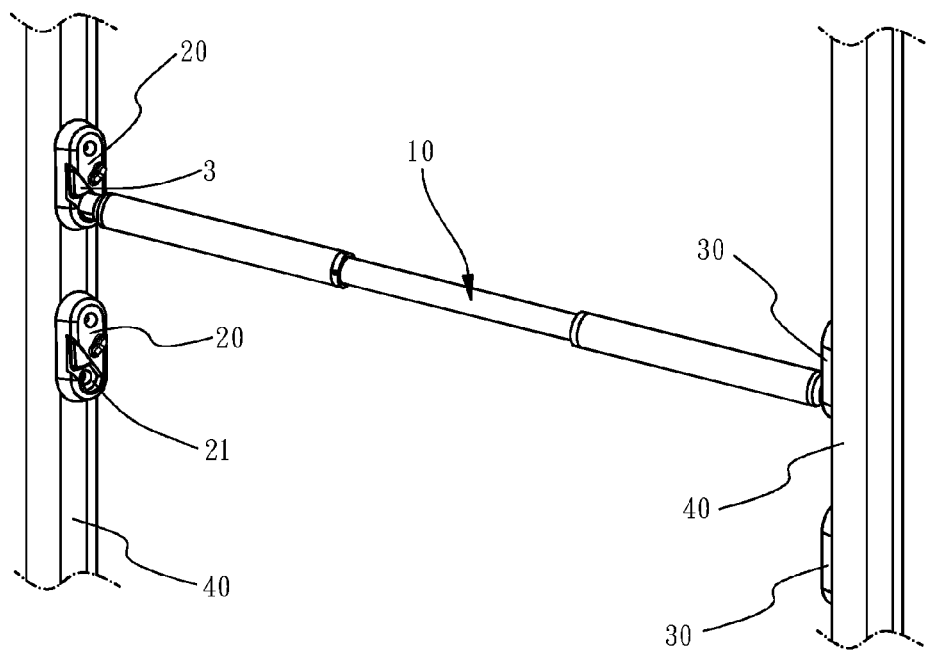
FIGS. 10 and 11 illustrate that a plurality of locking device and supporting base are fixed on the posts at different heights for allowing the horizontal bar to be secured at different heights.
Figure 11:
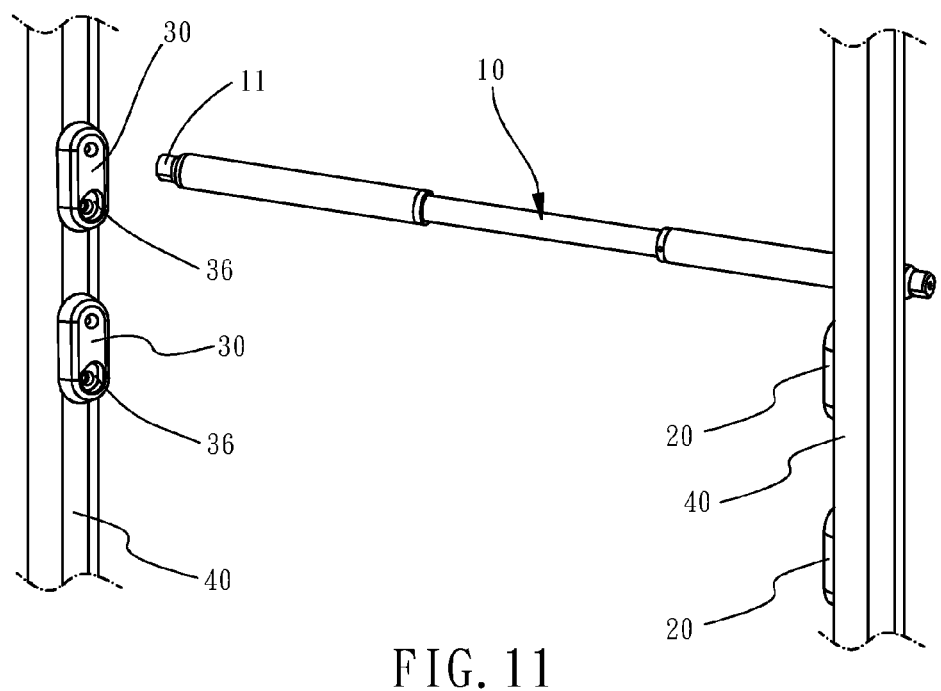

In another embodiment of the present invention (There are many similarities between the earlier embodiment and this embodiment, so generally speaking, only the difference between this embodiment and the earlier embodiment is further described), as shown in FIGS. 10 and 11, a plurality of locking devices 20 are fixed a post 40 at different heights, and a plurality of supporting bases 30 are mounted on a opposite post 40 and each supporting base 30 corresponds to each corresponding locking device 20. Therefore, users could mount a horizontal bar 10 at different heights according to their height, and remove the horizontal bar when it is not in use. Furthermore, each supporting base 30 has a positioning groove 36 for retaining one end part 11 of the horizontal bar 10 at first. Then, the other end part 10 of the horizontal bar 10 could be secured on the respective locking device 20 to complete the installation of the horizontal bar 10. Specifically, the positioning groove 36 of each supporting base 30 is slightly wider than the diameter of each end part 11 of the horizontal bar 10. As shown in FIG. 11, the positioning groove 36 is non-circular and substantially water drop-shaped. A tip portion of the positioning groove 36 which is substantially water drop-shaped corresponds to the inclined groove 21 of the housing 2. Therefore, the horizontal bar 10 at the time of detachment could have a certain margin in order to facilitate disassembly of the horizontal bar 10. Under this arrangement, when the user wants to detach the horizontal bar 10, the user just need to push the pushing button 32 to move the retaining block 3 toward the second position, and therefore the user could remove one end of the horizontal bar 10 from the locking device 20 and then pull the other end of the horizontal bar 10 out of the supporting base 30 to detach the horizontal bar 10.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A locking device for retaining an end part of a horizontal bar configured for pull-up exercises, the locking device comprising:
   a housing having an inclined groove defined therein and an opening in communication with the inclined groove and an interior of the housing, the inclined groove defining a closed end and an open end, the open end being at one side of the housing, the open end being above the closed end so that the end part of the horizontal bar is able to be rested in the closed end of the inclined groove of the housing;
   a retaining block having a pivoting portion pivotally mounted in the housing, the retaining block being rotatable with respect to the housing between a first position where the retaining block is located in the inclined groove through the opening of the housing, so that two sides of the retaining block within the inclined groove are respectively defined as an abutting face toward the open end of the inclined groove and a retaining face toward the closed end of the inclined groove for retaining the end part of the horizontal bar, and a second position where the retaining block is moved out of the inclined groove into the interior of the housing for allowing the end part of the horizontal bar to be removed from the housing, the retaining block further having a controlling portion opposite to the pivoting portion for being operated from the first position to the second position; and
   an elastic member disposed in the interior of the housing for substantially biasing the retaining block in the first position;
   wherein the end part of the horizontal bar is inserted into the inclined groove of the housing by pushing the abutting face of the retaining block toward the second position, and the retaining block is restored back to the first position once the end part of the horizontal bar is rested in the closed end of the inclined groove.

2. The locking device as claimed in claim 1, wherein the inclined groove of the housing is defined by two parallel side walls and the end part of the horizontal bar has two opposite parallel planes; when the end part of the horizontal bar is inserted into the inclined groove, the two parallel planes of the end part respectively abut against the two parallel side walls of the inclined groove to prevent the horizontal bar from being rotated.

3. The locking device as claimed in claim 1, wherein the housing has an aperture and the controlling portion of the retaining block is defined as a pushing button, the pushing button passing through the aperture of the housing.

4. A horizontal bar set configured for pull-up exercises, comprising:
   a horizontal bar;
   at least one locking device having a housing, a retaining block and an elastic member, the housing having an inclined groove defined therein and an opening in communication with the inclined groove and an interior of the housing, the inclined groove defining a closed end and an open end, the open end being at one side of the housing, the open end being above the closed end so that one end part of the horizontal bar is rested in the closed end of the inclined groove of the housing, the retaining block having a pivoting portion pivotally mounted in the housing, the retaining block being rotatable with respect to the housing between a first position where the retaining block is located in the inclined groove through the opening of the housing for retaining the end part of the horizontal bar, and a second position where the retaining block is moved out of the inclined groove for allowing the end part of the horizontal bar to be removed from the housing; the elastic member disposed in the interior of the housing for substantially biasing the retaining block in the first position, the retaining block further having a controlling portion opposite to the pivoting portion for being operated from the first position to the second position; and
   at least one supporting base disposed opposite to the locking device, the supporting base having a positioning groove for retaining the other end part of the horizontal bar;
   wherein the locking device and the supporting base are mounted on two opposite posts, and the horizontal bar is able to be locked or removed by the locking device.

5. The horizontal bar set as claimed in claim 4, wherein the inclined groove of the housing is defined by two parallel side walls and the end part of the horizontal bar has two opposite parallel planes; when the end part of the horizontal bar is inserted into the inclined groove, the two parallel planes of the end part respectively abut against the two parallel side walls of the inclined groove to prevent the horizontal bar from being rotated.

6. The horizontal bar set as claimed in claim 4, wherein the housing has an aperture and the controlling portion of the retaining block is defined as a pushing button, the pushing button passing through the aperture of the housing.

* * * * *